3,565,864
PROCESS FOR THE PREPARATION OF POLY-
ETHYLENE TEREPHTHALATE OF REDUCED
DIETHYLENE GLYCOL CONTENT
Antoine Girantet, La Mulatiere, France, assignor to
Rhone-Poulenc S.A.
No Drawing. Filed June 11, 1968, Ser. No. 736,011
Claims priority, application France, June 12, 1967,
111,007
Int. Cl. C07c 67/00; C08g 17/08, 17/013
U.S. Cl. 260—75                                    2 Claims

ABSTRACT OF THE DISCLOSURE

Polyethylene terephthalate of improved colour and freedom from diethylene glycol residues is obtained by the direct esterification and polycondensation method if the esterification is effected in the presence of a small amount of triethanolamine.

---

The present invention relates to the preparation of polyesters of terephthalic acid, and more particularly to the polyesters obtained by direct reaction of terephthalic acid with ethylene glycol.

It is known to obtain polyethylene terephthalate by direct esterification of terephthalic acid. The most commonly used method consists of reacting terephthalic acid with ethylene glycol, in a first stage, to produce bis($\beta$-hydroxyethyl) terephthalate as well as low polymers, and then, in a second stage, effecting the polycondensation with elimination of ethylene glycol. This process however suffers from the disadvantage of favouring the formation of diethylene glycol which becomes incorporated in the polymer during the esterification and polycondensation reactions. Now the presence of ether bonds thus introduced in the polymer chains considerably reduces the stability and lowers the softening point of the polymer.

This formation of diethylene glycol mainly takes place during the esterification phase, and various methods have been proposed for reducing its formation. These methods generally involve carrying out the esterification reaction in the presence of substances which inhibit or reduce the formation of the ether bonds. Substances which have been proposed for this purpose include oxides, alkali or alkaline earth metal alcoholates, hydrides and organic salts of metals, e.g. calcium acetate (see French Pat. No. 1,297,-516). These products are, however, insoluble in the final polymer and even when used in very small amounts they reduce the transparency of films obtained from the polymer. It has also been proposed to reduce the formation of diethylene glycol by using organic compounds which are soluble in polyethylene terephthalate, such as volatile tertiary amines, (see French Pat. No. 1,239,223 and Belgian Pat. No. 686,548) and certain quaternary ammonium compounds (see British Pat. No. 1,023,707).

It has now been found that practically colourless polyethylene terephthalate which contains only a very small proportion of diethylene glycol residues can be obtained by esterifying terephthalic acid with ethylene glycol in the presence of triethanolamine, and polycondensing the ester obtained. The amount of triethanolamine used is generally from 0.001% to 1%, preferably from 0.001% to 0.1%, by weight based on the terephthalic acid.

The triethanolamine is preferably added to the reaction mixture at the start of the esterification phase, which is carried out in a known manner at a temperature between 220° C. and 300° C., preferably between 230° C. and 270° C., at a pressure greater than or equal to the vapour pressure of ethylene glycol at the temperature used, with the molecular ratio ethylene glycol to terephthalic acid between 1.05, and 2:1, and preferably between 1.1:1 and 1.7:1. This stage of the process is conducted until a degree of conversion between 70% and 90% is obtained, and water produced during the reaction is removed at the rate at which it is formed. The operation may furthermore be carried out in the presence of catalysts such as, for example, cobalt salts.

The polycondensation phase is also carried out in conventional manner. The temperature is from 270° C. to 300° C., and the pressure generally below 1 mm. of mercury so as to remove the ethylene glycol formed during the reaction to the maximum extent. During this stage catalysts are usually employed. Antimony trioxide ($Sb_2O_3$) is particularly advantageous, and may be added to the mixture at the start of the esterification phase. It is also possible to use stabilisers for the polymer formed, such as phosphorous acid, or aryl phosphites or phosphates, which are generally incorporated at the start of the polycondensation.

The new process may be operated continuously or discontinuously.

The following example illustrates the invention. In this example, the colorimetric determinations were carried out on the polymers in the solid state, using a Zeiss "Elrepho" photocolorimeter. The results are expressed in accordance with the trichromatic XYZ system of representation of the international lighting commission [see Measurement of colour, Wright, Edit. Hilger & Watts, 3rd. edition, pages 96 to 127 (1964)]. The degree of whiteness, the luminescence and the dominant wavelength are determined in this way. The degree of yellowness, defined by the formula $$\frac{Rx - Rz}{Ry}$$

in which $Rx$, $Ry$ and $Rz$ represent the coefficients of diffuse reflection measured by the apparatus at different wavelengths is also calculated.

EXAMPLE

Terephthalic acid (2,490 g. 15 mols), ethylene glycol (1,395 g., 22.5 mols), and antimony trioxide (0.58 g.) are introduced into a 7.5 l. autoclave provided with a blade stirrer and a rectification column. Various amounts of triethanolamine as shown in the table below are also introduced into the autoclave. The stirred mixture is rapidly heated to 245° C. whilst a pressure of 4 bars is maintained with nitrogen. These conditions are maintained for 75 minutes while the water formed by the reaction is continuously distilled, and the pressure is then released to atmospheric pressure. The decompression operation, which takes 30 minutes, is carried out while the temperature of the reaction medium is kept at 245° C. The mixture is left at 245° C. for 15 minutes under atmospheric pressure and 29.2 cm.³ of ethylene glycol containing 0.58 g. of dissolved phosphorous acid are then added. The pressure is then lowered to 0.2–0.3 mm. Hg within 40 minutes while the temperature is simultaneously raised from 245° C. to 285° C. These new pressure and temperature conditions are maintained for 90 minutes, during which period the ethylene glycol formed is removed by distillation. The polymer is then extruded into water and granulated.

The table which follows indicates the results obtained with 0.03% and 0.012% by weight of triethanolamine based on the terephthalic acid. In this table, the diethylene glycol content in the structure of the polymer is expressed by weight based on the polymer.

| Amount of triethanol-amine, percent | Diethylene glycol content, percent | Softening point, °C. | Degree of whiteness, percent | Luminescence, percent | Dominant wavelength, mμ | Degree of yellowness |
|---|---|---|---|---|---|---|
| 0.03 | 1.37 | 259.2 | 88.3 | 48.1 | 575 | 0.21 |
| 0.012 | 1.66 | 259.6 | 92.3 | 60.6 | 574 | 0.124 |

If the process is repeated without the triethanolamine, polyethylene terephthalate of softening point 250° C., containing 4% by weight of diethylene glycol, is obtained.

I claim:
1. In a process for the preparation of film-forming or extrudable polyethylene terephthalate by esterifying terephthalic acid with ethylene glycol and polycondensing the ester obtained in the presence of a polycondensation catalyst, the improvement of carrying out the esterification in the presence of 0.001% to 1% by weight of triethanolamine based on the terephthalic acid.

2. The improvement of claim 1 in which 0.001% to 0.1% by weight of triethanolamine based on the terephthalic acid is used.

References Cited

UNITED STATES PATENTS

| 2,106,522 | 1/1938 | Ellis | 260—75N |
| 2,363,581 | 11/1944 | Frosch | 260—75N |
| 2,437,232 | 3/1948 | Rothrock et al. | 260—75T |

FOREIGN PATENTS

| 6,615,904 | 5/1967 | Netherlands | 260—75N |

WILLIAM H. SHORT, Primary Examiner

L. P. QUAST, Assistant Examiner

U.S. Cl. X.R.

260—475